Jan. 9, 1951.  C. E. EVERETT  2,537,186
GRAIN DRIER FOR COMBINE HARVESTERS
Filed July 17, 1946  4 Sheets-Sheet 1
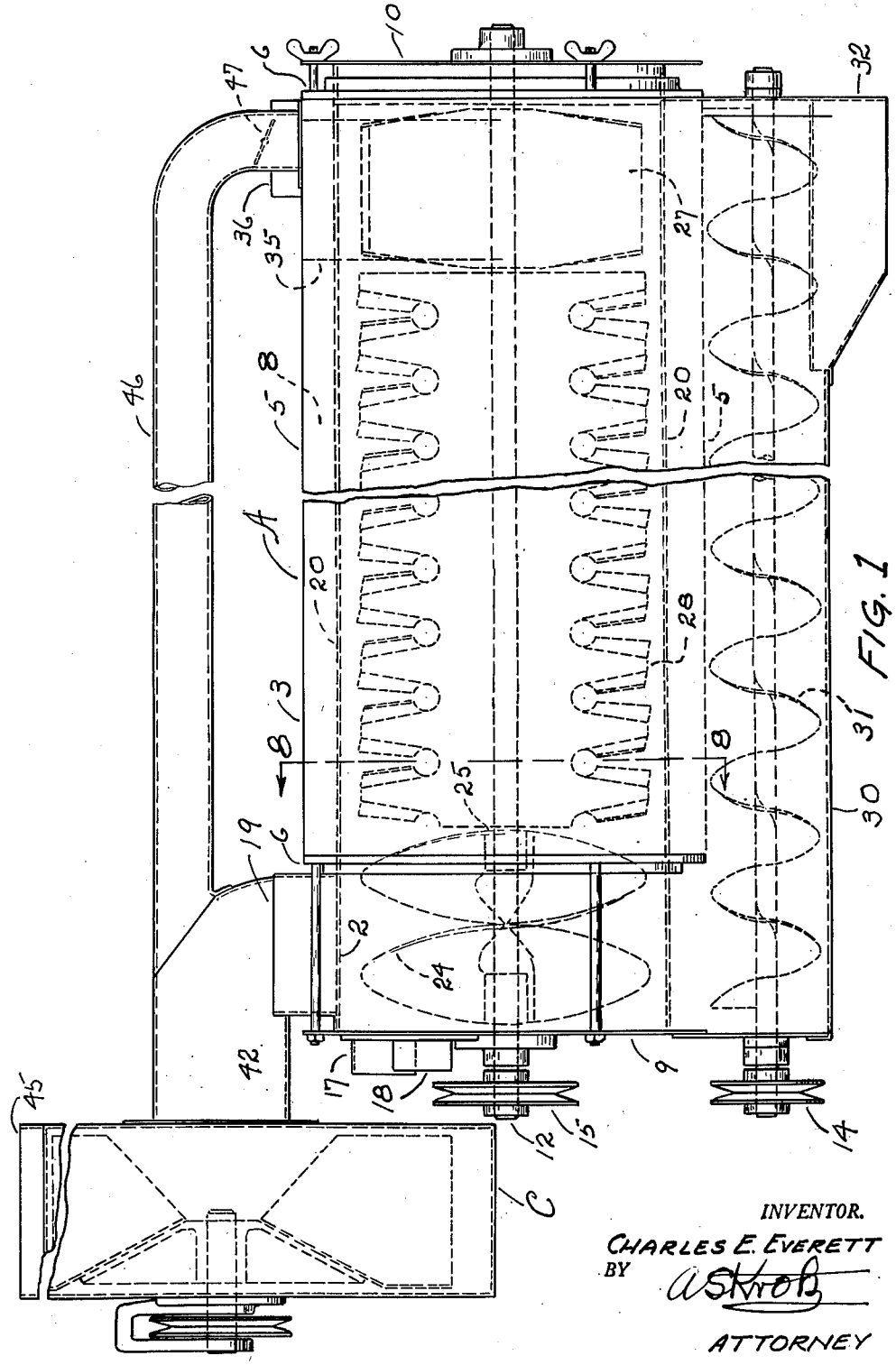
INVENTOR.
CHARLES E. EVERETT
BY
ASkrob
ATTORNEY Jan. 9, 1951  C. E. EVERETT  2,537,186
GRAIN DRIER FOR COMBINE HARVESTERS
Filed July 17, 1946  4 Sheets-Sheet 2
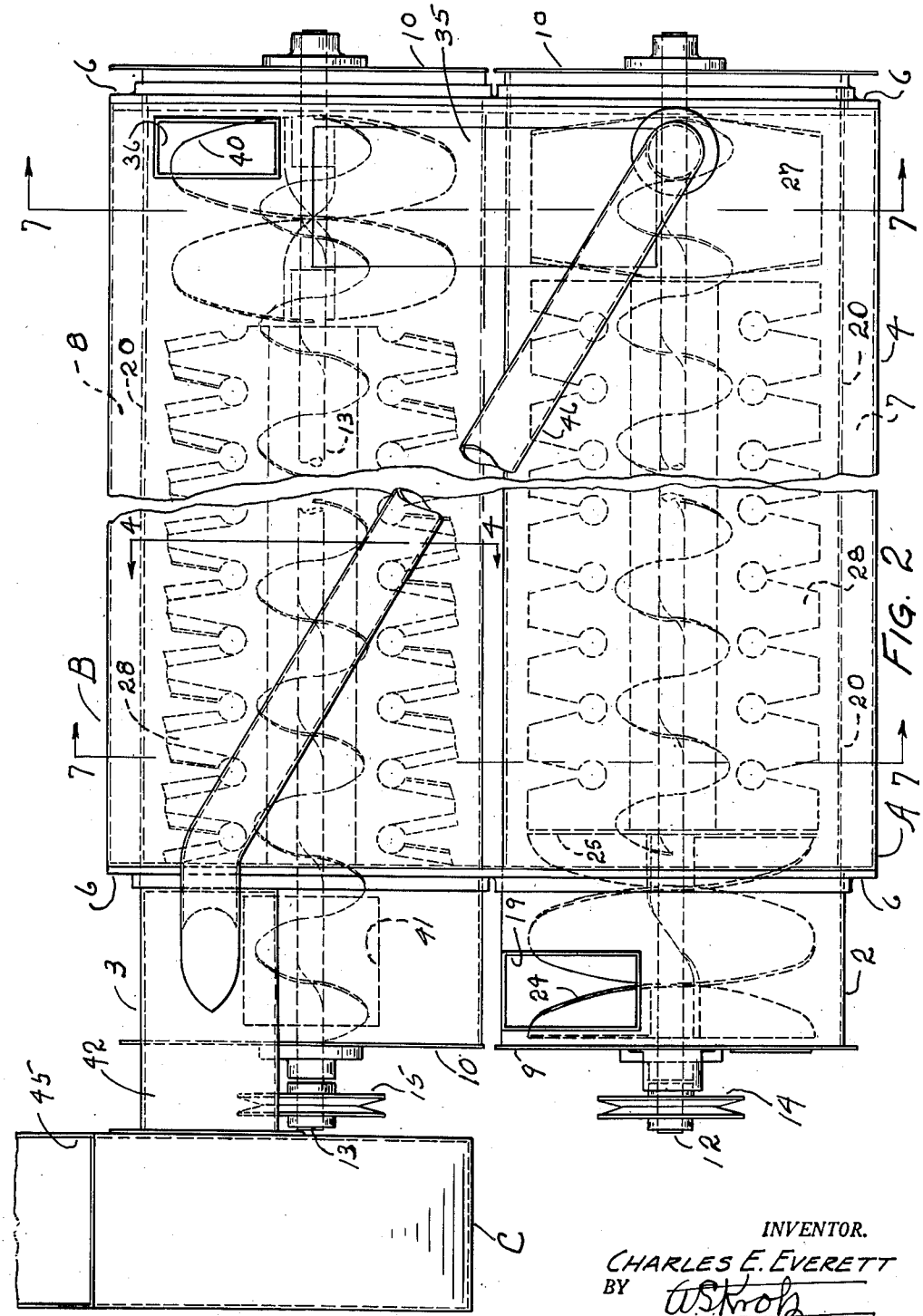
INVENTOR.
CHARLES E. EVERETT
BY
ATTORNEY Jan. 9, 1951 — C. E. EVERETT — 2,537,186
GRAIN DRIER FOR COMBINE HARVESTERS
Filed July 17, 1946 — 4 Sheets-Sheet 3

INVENTOR.
CHARLES E. EVERETT
BY
ATTORNEY

Jan. 9, 1951     C. E. EVERETT     2,537,186
GRAIN DRIER FOR COMBINE HARVESTERS
Filed July 17, 1946     4 Sheets-Sheet 4
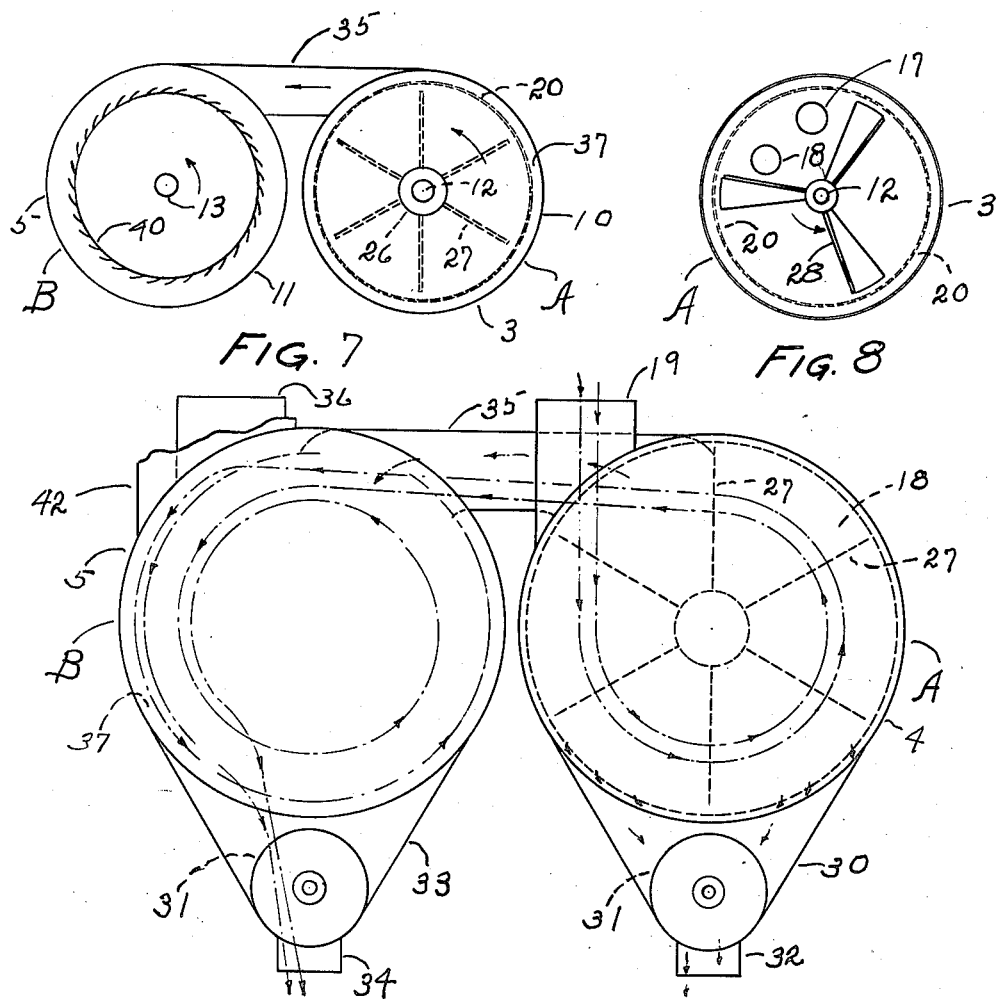
INVENTOR.
CHARLES E. EVERETT
BY
ATTORNEY Patented Jan. 9, 1951

2,537,186

UNITED STATES PATENT OFFICE 2,537,186

GRAIN DRIER FOR COMBINE HARVESTERS

Charles E. Everett, Racine, Wis., assignor to The Massey-Harris Company, Racine, Wis., a company of Maryland Application July 17, 1946, Serial No. 684,302

8 Claims. (Cl. 34—180)

The present invention relates to grain dryers particularly adapted for use on self-propelled combine harvesters and operating preferably on a two stage principle and wherein the exhaust from the engine is preferably used in the first stage, and outside air is used in the second stage, for taking up any remaining moisture on the surface of the kernels and for reducing the temperature of the grain to atmospheric temperature.

When grain is combine harvested, particularly wheat, it frequently contains too much moisture for safe immediate storage. By the use of my invention, regardless of the weather conditions, wheat may generally be harvested and stored any time after it is ripe.

The present invention may also be used on animal drawn harvesters wherein, if necessary, a burner for supplying heat to the first stage dryer is used.

An object of the present invention is to keep the kernels of grain in suspension during the entire time they pass through the device and to cause each kernel to travel a considerable distance during this time. It is estimated that practically every kernel of grain will make at least ten or fifteen circles in passing through each stage. Thus the distance traveled by the kernels in passing through both stages may be many times the length of the stages, the time element also being an important factor.

An object of the present invention is to provide means whereby if the combine and stirring device of the dryer is stopped without stopping the engine, the exhaust from the engine may be discharged from the pipe leading to the dryer into the atmosphere by means of a manually or automatically operated outlet valve, thus to prevent scorching the kernels remaining in the dryer. Furthermore when artificial heat is unnecessary this valve may be set to permit all of the exhaust to escape.

Generally stated the principal object of my invention is to provide an artificial grain dryer which is simple, efficient, compact and easily manufactured at low cost.

I accomplish the above enumerated results by novel agitators, novel arrangement of screens around the agitators, novel means for circulating the heated vapor through the first stage and novel means to move outside air through the second stage. In addition to dehydrating the grain I provide novel means for separating weed seeds from the grain as the grain passes through the first stage.

It will be understood that I prefer to use exhaust heat from the engine, when heat is necessary. I may however use artificial heat in the form of an oil burner when exhaust gas is not available.

To these and other useful ends my invention consists of parts, combination of parts or their equivalents and mode of operation as hereinafter described and claimed and shown in the accompanying drawings in which:

Fig. 1 is a side elevational view of the first stage of my device.

Fig. 2 is a top view of the device illustrating the first and second stage members of my device.

Fig. 6 is a diagrammatic front end drawing of the two stages and illustrating the gathering troughs, but not including the blower fan and its inlets.

Fig. 7 is a sectional view taken on line 7—7 of Figure 2.

Fig. 8 is an end sectional view taken on line 4—4 of Figure 1.

Figure 5:
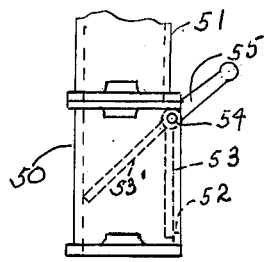
Fig. 5 is an elevational view of the exhaust or heated vapor bypass valve located in the exhaust pipe leading to the first stage.

In my device the grain is first agitated and held partially in suspension as it passes through the number one stage which in its entirety is designated by reference character A. The major drying in this stage is done preferably by artificial heat. The second stage is designated by reference character B. The grain after passing through the first stage is delivered to the rear end of the second stage and agitated and held in suspension as it passes forward through this stage and is completely dehydrated by outside air which is drawn into the rear end of the second stage and then passes into the blower fan C.

Figure 3:
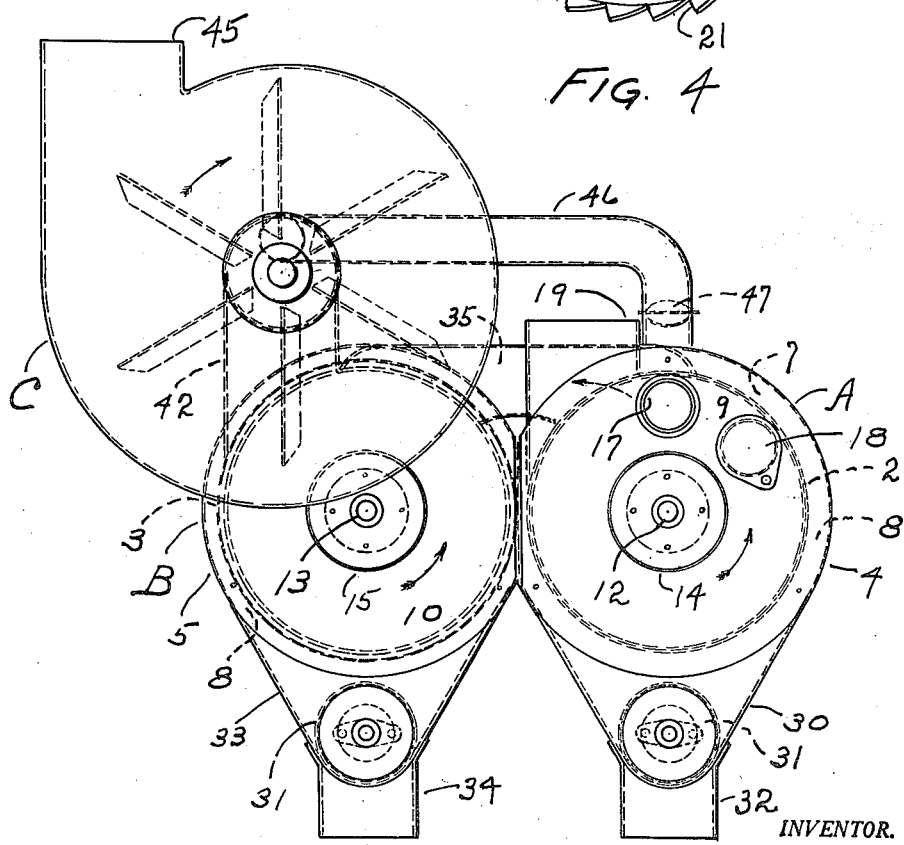
Fig. 3 is a front end elevational view of the device as shown in Figures 1 and 2.

Members A and B consist of two cylinders 2 and 3 and outer cylinders 4 and 5 which are held to cylinders 2 and 3 by annular rings 6—6, thus forming annular chambers 7 and 8. The front end of cylinder 2 has a closure 9 and the rear end a closure 10. Both ends of cylinder 3 also have closures 10. The housings thus formed are placed side by side, the end closures having rotatably mounted thereon shafts 12 and 13 which are concentric with cylinders 2 and 3. These shafts each have V belt pulleys 14 and 15 secured to their protruding front ends by means of which the shafts are turned anti-clockwise when viewed from the front as indicated by arrows in Figure 3.

The front end closure 9 of housing A has an opening 17 which is preferably adapted to receive the exhaust gases from the engine or artificially heated air. An inlet 18 is preferably provided in member 9 and is supplied with a gate valve (not shown) by means of which more or less outside air may be admitted into cylinder 2. A grain inlet 19 is provided in the front end of cylinder 2 (see Figures 3 and 6).

Figure 4:
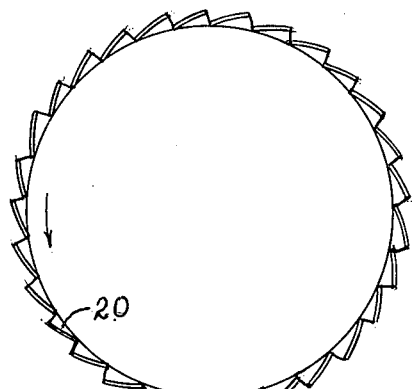
Fig. 4 is a transverse sectional view of the screen used in the second stage unit.

Cylinders 2 and 3 between rings 6 are preferably formed into screens 20 providing openings 21 in cylinder 3 as shown in Figure 4, which is a section on line 4—4 in Figure 2. The screen in cylinder 2 is adapted to prevent the grain from passing therethrough but allow weed seed and the like to do so; and the screen in cylinder 3 is adapted to permit grain to pass outwardly therethrough and permit outside air to pass therethrough and into the cylinder as will hereinafter appear.

On the front end of shaft 12 and terminating as at 25 I provide a worm 24. The object of this worm is to start the material moving rearwardly. On the rear end of shaft 12 I secure a hub 26 having a number of peripherally spaced ejector blades 27 (see Figures 2 and 6) for a purpose which will hereinafter appear.

Between ejector blades 27 and worm 24 I mount a number of longitudinally spaced blades 28. These blades terminate at their outer ends near screen 20 and have a suitable angle and shape so the grain will be caused to move rearwardly partially in suspension and in a spiral path; this is accomplished by fanlike blades which are preferably slightly curved rearwardly at their ends so as to partially counteract centrifugal force. The weed seed passes through screen 20 to an outlet trough 30 having an auger conveyor 31 which moves this seed, dirt etc., to an outlet 32. A duct 35 forms a connection between the rear end of cylinders 2 and 3. The duct is in line with blades 27 which impells the grain through this duct and into cylinder 3. An opening 36 forms an outside air inlet to the rear end of cylinder 3. A trough 33 is adapted to receive the dehydrated grain from cylinder 3, and having an auger conveyer 31 which moves the grain rearwardly and discharges it in an outlet 34.

On the rear end of shaft 13 and within screen 20 I provide a short auger conveyer 40 adapted to start the grain forward. Another number of blades 28 are secured to shaft 13 which extend from member 40 to the front end of screen 20 and will act to whirl the grain forwardly and spirally in suspension.

Trough 33 has an inlet 41 from the front end of cylinder 3, whereby when the machine is in operation blades 28 will move the grain forward which finally passes into trough 33 through trough inlet 41. Fan C has an inlet duct 42 from member 3. Thus the dehydrated grain will be discharged into the trough and to outlet 34 from whence it may be conveyed to a tank or sacking platform as is the custom on combines. Fan C is conventional and preferably driven by a V belt pulley and has an outlet 45.

Vapor is conveyed from the rear end of cylinder 2 into the fan through duct 46 having a gate valve 47 so the volume of air and exhaust gases may be regulated. Valve 47 may be adjusted so no air is drawn into cylinder 2 through opening 18. However if this valve is wide open, considerable outside air may enter this opening.

Thus it will be seen by scrutinizing the various figures that heated air or exhaust will enter the front end of cylinder 2 and that outside air will be drawn into the rear end of cylinder 3 and that the grain and heated air or exhaust or outside air will be caused to move spirally through both cylinders.

Clearly with the two dehydrating stages, one operating largely because of the heated air or exhaust and a second stage using outside air, the machine will operate efficiently because of the long path traveled by the grain in suspension; and furthermore the outside air in the second stage will tend to reduce the temperature of the grain to atmospheric temperature.

Referring now to Figure 5, a valve housing 50 is provided, having a pipe 51 for connection to inlet 17 in cylinder 2 and a similar pipe (not shown) is adapted to receive the exhaust from an engine or an artificial outside air heater, the valve having an outlet 52. A gate valve 53 is hinged in the upper end of opening 52 as at 54 and having a lever 55 connected to this hinge whereby the valve may be opened or closed either automatically or mechanically. The valve is shown in an open position by dotted lines and in a closed position by reference numeral 53'. Thus when the outlet of the valve is closed the exhaust will go direct to inlet 17 and when the valve is moved to the position shown by the position 53', the exhaust will be discharged into the atmosphere. Means may also be provided for adjusting the valve to various positions.

I do not wish to be limited to any particular design of screen especially the screen used in cylinder 2. Clearly many minor detail changes may be made without departing from the spirit and scope of the invention as recited in the appended claims.

I claim:

1. A grain dryer for combine harvesters comprising, first and second circular in cross section cylinders in parallel relation, an air and a heated vapor inlet in the front end of the first cylinder, a major portion of said cylinders in the rear being formed into screens, other cylinders surrounding the screen portions of said first and second cylinders, a grain inlet at the front end of said first cylinder, a grain outlet in the bottom of the other cylinder of said second cylinder, a duct forming a connection between the rear ends of said first and second cylinders, an outside air inlet in the rear end of said second other cylinder, a fan having an inlet from the front end of said second cylinder, a tube connection from the rear end of said first cylinder to the front end of said second cylinder, shafts concentrically and rotatably mounted in said first and second cylinders and means for driving the same, impelling blades on the rear end of the shaft of said first cylinder adapted to impel the grain from the first cylinder into the second cylinder through said duct, fan blades mounted on the first cylinder shaft extending forward from said impeller blades to the front end of the adjacent screen and adapted to stir and move the grain circularly and rearwardly in partial suspension, blades mounted on the shaft of said second cylinder and adjacent the screen thereof, and adapted to stir and move the grain circularly forwardly, said first cylinder screen adapted to permit weed seed and the like to pass therethrough and into its other cylinder, the screen in said second cylinder adapted to permit air to pass from its other cylinder through the screen and into said second cylinder and adapted to permit the grain to pass outwardly through said second cylinder screen, a blower fan having a suction connection from the forward end of said second cylinder, whereby the grain may pass through said first cylinder and then partially through the second cylinder and be dehydrated by the action of air and vapor passing through the cylinders.

2. A device as recited in claim 1 including, a valve in said duct leading from the rear end of said first cylinder to the blower fan, having adjustable means whereby the volume of the air and vapor passing therethrough may be regulated.

3. A device as recited in claim 1 including, the blades in said first cylinder terminating at the forward end of the screen, a spiral conveyor secured to the shaft of said first cylinder and positioned between the end thereof and the front end of the stirring blades and adapted to start the entering grain rearwardly.

4. A device as recited in claim 1 including, the blades on the shaft of said second cylinder terminating a short distance from the rear end thereof, a spiral conveyor secured to the second cylinder shaft and filling the space between said blades and the rear end of the cylinder and adapted to move the entering grain forwardly into the blades.

5. A grain dehydrator of the character described comprising, elongated first and second cylinders, shafts longitudinally and rotatably mounted in said cylinders, a fan having an inlet connection from the outlet end of said second cylinder, means for driving said shafts and fan, a passageway between the outlet end of said first cylinder and the inlet end of said second cylinder, a third cylinder surrounding said first cylinder, one end stopping a short distance from the inlet end of the first cylinder and forming an annular chamber, the part of said first cylinder surrounded by said third cylinder including a screen adapted to permit weed seed and the like to pass therethrough, a fourth cylinder surrounding said second cylinder, one end terminating a short distance from the outlet end of said second cylinder and forming an annular chamber, the part of said second cylinder adjacent said fourth cylinder including a coarse screen adapted to permit grain and air to pass freely therethrough, grain, outside air and heated vapor inlets in the inlet end of said first cylinder, each said shafts having thereon blades adapted to assist said fan to stir and move the air, heated vapor and grain toward the outlets, said second cylinder screen and the blades on the second cylinder shaft being adapted to cause all of the grain to move into said fourth cylinder through the second cylinder screen, an outside cool air inlet into the inlet end of said fourth cylinder, whereby the relatively cool entering air will be mixed with and cool the grain as it passes from the second cylinder into said fourth cylinder, whereby the grain is first warmed and dehydrated and then cooled and dehydrated.

6. A device as recited in claim 5 including, a duct forming an operating connection between said fan inlet and said third cylinder adjacent the discharge end of said first cylinder and having a valve for regulating the volume of air and heated vapor permitted to pass therethrough.

7. A device as recited in claim 5 including, a valve in the heated vapor inlet to said first cylinder adapted to regulate the volume of heated vapor permitted to pass into the first cylinder.

8. Means for dehydrating grain in two stages serially, comprising in combination, a first and second cylinder, a passageway between the outlet end of said first cylinder and the inlet end of the said second cylinder, heated vapor and grain inlets in the other end of said first cylinder, an exhaust fan having an air inlet connection from the other end of said second cylinder, shafts rotatably mounted in said first and second cylinders, means for driving said shafts and fan, a third cylinder surrounding said second cylinder, a multiplicity of louvres in said second cylinder, forming grain outlets into said third cylinder, and air passageways from said third cylinder into the second cylinder, a grain outlet in said third cylinder, an outside air inlet in said third cylinder adjacent said first passageway, a number of fan blades mounted on said first cylinder shaft adapted to agitate the grain and vapor, and urge them toward said first passageway, a number of fan blades secured to said second cylinder shaft, and adapted to agitate the vapor and urge the vapor toward said fan inlet and urge the grain through the louvres into said third cylinder, whereby the grain will be first contacted by the heated vapor and dehydrated, and then cooled and dehydrated by outside air.

CHARLES E. EVERETT.

REFERENCES CITED

The following references are of record in the file of this patent:

UNITED STATES PATENTS

| Number | Name | Date |
|---|---|---|
| 426,361 | Buttner et al. | Apr. 22, 1890 |
| 517,479 | Onderdonk | Apr. 3, 1894 |
| 566,143 | Cromwell et al. | Aug. 18, 1896 |
| 629,384 | Manns et al. | July 25, 1899 |
| 713,859 | Criswell | Nov. 18, 1902 |
| 891,468 | Dougan | June 23, 1908 |
| 937,172 | Pearson | Oct. 19, 1909 |
| 1,008,256 | Gnadt | Nov. 7, 1911 |
| 1,658,775 | Campbell | Feb. 7, 1928 |
| 1,677,651 | Noonan | July 17, 1928 |
| 2,160,253 | Ryland | May 30, 1939 |

FOREIGN PATENTS

| Number | Country | Date |
|---|---|---|
| 224,111 | Great Britain | Nov. 6, 1924 |